Patented June 28, 1938

2,122,288

UNITED STATES PATENT OFFICE 2,122,288

PROCESS OF MAKING CELLULAR REFRACTORY BODIES

John M. Knote, South River, N. J., assignor to Quigley Company, Inc., South River, N. J., a corporation of New York No Drawing. Application July 30, 1935,
Serial No. 33,821

5 Claims. (Cl. 25—156)

This invention relates primarily to refractory linings for boiler furnaces, and particularly to marine boiler plants, though it is applicable to all types of furnaces for stationary plants, to gas generators, some metallurgical furnaces and other chambers wherein the conservation of intense internal heat is important.

In substance the invention consists of a very lightweight, cellular firebrick or other refractory mass, and a method of making the same, the voids and/or air cells in such mass of refractory material being so numerous and uniformly distributed throughout the interior thereof and the walls separating such voids or cells being of such character that the product has very low heat-conducting, storage and radiating capacity though highly refractory and strong structurally.

Consequently when used to form the walls and roof or to line the walls of boiler furnaces or other combustion or heating chambers in place of ordinary solid firebrick, the product of my invention not only serves the usual structural and heat resisting purposes but also prevents the loss by radiation and/or conduction of that considerable portion of heat liberated by combustion of the fuel which has heretofore generally been allowed to go to waste, or has been conserved by covering the outer surfaces of the solid brick furnace walls with some separate mass of heat insulating material such as is used for covering steam pipes and boilers.

As contradistinguished from this last above-mentioned prior practice, my present invention combines in one wall, high resistance to heat, strength, low heat storage and high heat-insulating qualities, with the added advantages of light weight which produces savings in freight, cost of handling and supporting structure. Also masses made in accordance with my invention may be sawed or cut to any desired shape, thus enabling the manufacturers of refractories to promptly fill special orders though carrying in stock a lesser quantity and variety of original standard shapes.

It has heretofore been proposed to make porous brick, or terracotta lumber, having the above noted general characteristics partially developed, by mixing sawdust, ground coal and similar combustible materials with the clay which is being molded into bricks or other forms of tiling, and then relying on the heat of the brick kiln to gasify the combustible and evaporate the volatile constituents, thereby leaving pores in the finished product. The procedure heretofore followed, however, has produced a haphazard type of honeycomb structure with irregular pores more or less completely separated one from another by thick walls. Such thick walls, of course, serve as good heat conductors and radiators and therefore reduce the insulating efficiency per unit of total wall thickness. The result of this prior practice has always been a fairly weighty mass having more or less of the desired heat-insulating properties seriously limited by high heat storage and transfer capacity. Therefore very few of these prior art products were intended or used to form furnace walls, the greater proportion being used in ordinary building construction.

I have found, however, that if the proper materials be selected and intelligently treated a type of cellular structure having relatively thin but continuous cell walls may be produced out of highly refractory materials which approximates the low heat storage and conducting characteristics of a synthetically produced diatomaceous earth or kieselguhr, combining with the desirable heat insulating qualities of the kieselguhr the refractory qualities of the best firebrick.

According to the preferred procedure in carrying out my invention a relatively large quantity of shredded or small fragmentary bits of waste paper is intimately mixed dry with a finely divided refractory such as fire clay and made into bricks. The best results have been realized when old newspapers without previous wetting or other treatment are fed to a rotary hammer mill which shreds and mascerates the paper sheets and blows the resultant material through an 8-mesh screen, so that no particles of said material are more than ⅛ inch in dimensions and the greater portion thereof, of course, is in the form of much smaller fragments, fine fibers of cellulose or dust. Such rotary hammer mills acting on materials in air suspension are in some cases successfully operated without any wire screen if there is no requirement as to exact uniformity and grading as to fineness of product, and this can be done in my process. The important point is not the uniform size of the paper particles and fibers which are produced, but the reduction of a major portion thereof to a fluffy mass of fibers and small particles such as can be produced by impact in air suspension in a standard form of hammer mill and the product air-borne from the impact zone, whether or not it has passed through a screen during that operation.

While I have so far found this method of preparing the paper most satisfactory and economical, it may be that some other way of reducing cellulose fibers to the desired uniform fineness of division (much less than is practicable of attainment with sawdust) might be substituted. The essential point as at present understood is that a multiplicity of small cells of controlled maximum size shall be produced by combustion of freely burning, finely divided fuel, as distinguished from the results obtained by any of the so-called "bloating" methods of the prior art in which large and uncontrollable volumes of gases are generated by chemical action and leave relatively large, irregular, bubblelike spaces of uncertain dimensions in the completed product. Such fluffy mass is then mixed dry with a good quality of dry fire clay or other finely divided refractory material. Such mixing can be conveniently done in an ordinary pug mill and I prefer to use a mixture by volume of about two and a half (2½) parts of the shredded paper with one (1) of the fire clay. By weight the above stated mixture would be about one (1) pound of paper for every two (2) pounds of the clay.

This mixture is then tempered with just enough water to produce the degree of plasticity best suited for the brick-making process and, after being worked or kneaded further in the usual manner, is molded into brick of the standard or special shape and these are dried in any convenient apparatus. The molding is accomplished with the lightest possible pressure so as to avoid reducing the volume of each molded mass and the dried brick are burned in any suitable brick kiln.

During the first period of about 24 hours of kiln operation a temperature of about 1100 degrees Fahrenheit is preferably maintained with an excess of air admitted to the kiln interior. The paper filler in the bricks soon apparently catches fire as the bricks glow rather quickly and the temperature in the kiln interior becomes practically self-sustaining and so continues for some time without the admission thereto of externally heated gases. During the succeeding 48 hours a temperature of about 2400 degrees Fahrenheit or more is maintained by firing the kiln in the usual way while shutting off the admission thereto of extra air.

By the term "dry" as above used in referring to the paper and clay, I mean not artificially moistened, the materials being left in whatever condition as to contained moisture may result from atmospheric conditions, that is to say no artificial drying of the raw materials is employed.

Bricks of standard dimensions, 9 by 4½ by 2½ inches made according to my above described process weigh only about two (2) pounds and two (2) ounces, which is less than one-third of the weight of an ordinary solid firebrick of that size made out of the same clay. This means that about 70% of its total volume is composed of air cells and even lighter brick can be made by increasing the proportion of paper. Practically all of these bricks will support a working load of eight (8) pounds to the square inch and withstand a working temperature of about 2500 degrees Fahrenheit, not beginning to soften until about 3100 degrees Fahrenheit is reached. They have a heat conductivity of only a fifth to a fourth that of ordinary solid firebrick.

Among the considerations of importance in the commercial manufacture of cellular brick which are to be used principally, if not solely, as heat insulating refractories may be mentioned the following:

Plasticity of the original mixture which renders it easy to mold, i. e. the mixture must not be "short", as it is called when it tends to crumble during handling.

Economy in the use of heat required to dry the molded masses, which means that the mixture should be one which can be tempered, i. e. rendered sufficiently plastic for molding, with the minimum quantity of water.

The least possible development of shrinkage and warping during drying and burning of the masses.

Strength and toughness in the finished product as distinguished from fragility and, of course, high heat-insulating capacity.

After rather long and careful experiments I have found that my herein-described process and product meet all these requirements satisfactorily.

As at present advised I believe old newspapers to be the best combustible filler for use in the original mixture for the following reasons among others:

The fine cellulose fiber of the paper sheets and the carbon of the ink thereon leave just the right combination of substantially closed air cells after gasification in the kiln. These cells are varied in shape, some round, some threadlike, and some flat or laminated in appearance and present the greatest resistance to the passage of heat by conduction, while leaving cell walls thin but producing the desired strength in the burnt mass.

The portion of the paper which has been shredded or is in fragmentary condition serves as a physical binder for the clay (like the hair in plaster) and makes the masses tougher and more plastic when tempered with water. Consequently there is less wastage in handling the molded masses throughout the process and fewer defective brick produced.

The paper fragments and cellulose fibers absorb the water quickly and evenly and are thereby swelled to just the right extent. Excessive water absorption and swelling of the mass, as in the case of wood flour, result in objectionable "shortness" of the mixture and in excessive shrinkage and warping.

Finally, I believe that the shredded paper ignites more quickly and burns more rapidly and freely than does sawdust or wood flour during the first portion of the kiln operation, thereby saving both time and fuel.

Whether or not the foregoing theories are correct, the practical results from the use of my invention are rapidity and economy in operation together with avoidance of shrinkage, warping and wastage and strength with lightness and low heat-conductivity in the product.

Cellulose may be obtained for use in my invention from other sources, but I have so far found old newspapers or other waste print paper to be best suited for use in my invention and this is most fortunate because old newspapers form a waste product which can be bought in ample quantity in any city at about 20% of the cost of even the cheapest grade of sawdust. Furthermore the dried ink thereon seems to have a beneficial function in the process in the manner hereinbefore suggested.

Such dried ink is nearly pure carbon originally in the form of lampblack, and is composed of fine particles which are less dense than ordinary pulverized coal. They also are more quickly gasified by the heat of the kiln and so cooperate most efficiently with the cellulose of the paper in the desired cell development in the final product.

When the shredded fiber and broken-down particles derived from the disintegration of the loosely felted cellulose fabric of the old printed paper are burned in the kiln they leave cells of various shapes in the hardening mass of clay, as before explained. These cells are separated one from another by thin walls, but these thin walls themselves originally contained practically all the fine particles of carbon and hydrocarbon of the dried ink on the paper, since that all went into suspension in the tempering water and thereby became distributed evenly among the clay particles which formed said walls.

It is known that these minute particles of carbon constitute by weight nearly 2% of the old printed paper, since the purchases of ink for a newspaper plant during any one long period average about that proportion to the purchases of paper.

These fine particles of lampblack and oil, thus distributed, are also burned in the kiln as well as the cellulose particles and consequently the walls of the larger cells in my improved product (however thin they may be) are themselves cellular in construction, and the familiar principle of securing heat insulation by means of an infinite number of closed air cells is carried to the limit in my improved product,—which accounts for its high non-heat-conducting quality.

These highly combustible, minute, evenly distributed particles not only leave the greatest possible number of small air cells after they are burnt out, but also by their spontaneous combustion in the presence of an excess of air they apply heat directly and most efficiently to the interior of every portion of the mass during the earlier stages of kiln operation, thereby expediting the kiln burning and saving some of the more costly fuel that would otherwise be needed to create the external heat for the operation. They may also thus serve to quicken the ignition of the still finer particles of vegetable matter generally assumed to be present to some extent in all plastic clays as a consequence of their having been originally deposited by sedimentation. Moreover, the heat supplied by ordinary fuel (being externally applied) must be conducted through the outer portions of the molded masses before reaching the interiors thereof, with the result that the exteriors of the bricks might be over-burned if an operation employing exterior heat alone were hurried while the interiors of such bricks might be under-burned. This most efficient utilization of all the internally distributed fuel in my process also constitutes an economical advance over certain disclosures in the prior art in which it has been proposed to mix ground coal with clay to produce cellular bricks. Coal is costly and grinding it to the necessary fineness is also expensive, while the finely divided carbon of the dry ink on old printed paper which I employ is a waste product.

Whatever may be the true reason for the improved results obtained the fact remains that the product of this invention is much superior to other cellular refractories now or heretofore produced by using sawdust, yeast-like gases, etc.

I also believe that the multi-cellular construction produced in my process is partly due to the considerable amount, and even distribution, of the water content of the tempered mass resulting from the hygroscopic character of the waste paper which swells up to just the right extent during the tempering step of the process, as before explained. Obviously the more water thus held in absorption in the mass and evenly distributed therethrough the more steam is generated at more numerous points in the drying of the mass, and the greater the number of fine cells left after such steam escapes.

The differences in function and result between my invention and the prior art in which sawdust was most commonly used will be readily perceived when it is realized (as hereinbefore suggested) that sawdust is composed of relatively coarse, approximately spherical wood particles which have relatively low water absorption capacity and are slow to gasify in the kiln, as compared with the originally loose, fluffy, ultimately saturated paper stock used in my process.

I am aware that it has been heretofore incidentally suggested that paper might be used in making porous brick, paper being mentioned perfunctorily as one of a long list of combustible fillers for use with one or another patented, special brick-making materials, but no definite procedure for so utilizing it has ever been disclosed, so far as I know, nor has any such ever been put into practical successful use before my invention. Still less has any one realized the importance of the particular method of treatment of such material I have hereinbefore described, nor the special advantages of the character above pointed out resulting from the use of old newspapers, though they have been a drug on the market in vast quantities for generations.

As indicating the practical importance of the invention it may be stated that careful calculations have shown that if the light-weight firebrick embodying it be substituted for the heavier type heretofore specified for the boiler furnaces of the 10,000 ton cruisers being built for the U. S. Navy, enough dead weight will be thereby eliminated to permit the addition of another 8-inch gun to the armament of such war vessel.

Similarly the use of my invention in the field of marine traffic conserves additional cargo and passenger capacity in a given hull, or secures the same capacity in a hull of smaller size.

Old and/or broken brick or other refractory masses made in accordance with my invention, or masses specially prepared for the purpose may be broken, crushed or ground to form what is known as "grog" and used to any desired extent as a filler in making new brick or refractory linings in accordance with established firebrick makers' practice. This re-use of old material not only reduces the cost of the final product, but adds to its structural strength and heat-resisting quality, while also reducing any liability to shrinkage or warping during drying, or while in the kiln and this without increasing its heat insulation and storage properties.

All boiler furnaces lined with products of my invention have the important advantage of quick steaming since less heat is absorbed by the furnace lining on initial firing of the boiler. Consequently a larger proportion of the heat liberated during the initial firing is immediately available for steam generation. The same is true on any sudden demand for a considerable increase of steam production as on a hurry call for maximum steam pressure while running under cruising conditions. Similarly, upon receipt of orders to shut down, wholly or partially, a quicker response from the steam plant is possible and there is less stored heat to be wasted in generating steam for discharge through the safety valves while the gauge pressure is being reduced. These functions cooperate most effectively and particularly with the modern oil burning plants daily coming into more general use in marine work.

Having described my invention, I claim:

1. The herein described process of making a cellular firebrick of low heat conducting capacity which comprises shredding old newspapers and blowing the fragments through a fine screen to produce a fluffy mass of cellulose fibers, mixing such air blown mass with a good quality of fire clay in about the proportions by weight of two parts clay to one of paper, tempering the mass with just sufficient water to render it plastic, molding under the lightest pressure possible to avoid reducing the original volume of the mass, drying and burning the brick so formed.

2. A process such as defined in claim 1 in which the brick burning kiln is heated to a temperature of about 1100 degrees Fahrenheit with the admission thereto of an excess of air during about the first twenty-four hours of operation and thereafter heated to at least about 2400 degrees Fahrenheit substantially without admission of atmospheric air during the remainder of the kiln operation.

3. The herein described process of making a cellular firebrick of low heat conducting capacity which comprises shredding paper by impact while in air suspension and blowing the fragments away from the impact zone for collection in a location exterior thereof, mixing such air-blown mass with a good quality of fire clay in about the proportions by weight of two parts clay to one of paper, tempering the mass with just sufficient water to render it plastic, molding under the lightest pressure possible to avoid reducing the original volume of the mass, drying and burning the brick so formed.

4. A process such as described for making highly cellular refractory bodies of minimum weight and maximum possible strength which comprises breaking down and shredding old printed paper, thoroughly mixing the same with a good quality of fire clay while dry in the proportions of about 2½ volumes of the paper mass to 1 of the clay, tempering such mixture with enough water to render the clay plastic, working and kneading such tempered mass to uniformly distribute the constituents thereof, and then molding the same into desired forms and burning in a kiln until all the combustible materials are consumed; whereby there are produced refractory bodies of multicellular form with the walls of their larger cells also cellular in construction.

5. The herein described process of economically producing cellular brick which comprises heating bodies of fire clay containing uniformly distributed small particles of old printed paper to a temperature at which said particles will ignite, then supplying sufficient air thereto to effect complete combustion of both said paper and the ink thereon, and finally heating said bodies to at least about 2400 degrees Fahrenheit for about 48 hours substantially without admission of air.

JOHN M. KNOTE.